(12) United States Patent
Sakai

(10) Patent No.: US 9,774,281 B2
(45) Date of Patent: Sep. 26, 2017

(54) MOTOR DRIVE DEVICE

(71) Applicant: DENSO CORPORATION, Kariya, Aichi-pref. (JP)

(72) Inventor: Koji Sakai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/037,763

(22) PCT Filed: Feb. 6, 2015

(86) PCT No.: PCT/JP2015/000555
§ 371 (c)(1),
(2) Date: May 19, 2016

(87) PCT Pub. No.: WO2015/129171
PCT Pub. Date: Sep. 3, 2015

(65) Prior Publication Data
US 2016/0294309 A1    Oct. 6, 2016

(30) Foreign Application Priority Data

Feb. 27, 2014   (JP) .................................. 2014-037043

(51) Int. Cl.
*H02P 27/00* (2006.01)
*H02P 6/14* (2016.01)
(Continued)

(52) U.S. Cl.
CPC ................ *H02P 6/14* (2013.01); *B60L 1/003* (2013.01); *B60L 3/003* (2013.01); *B60L 11/14* (2013.01);
(Continued)

(58) Field of Classification Search
CPC .......... H02P 29/00; H02P 27/08; H02P 31/00; H02P 7/29
See application file for complete search history.

(56) References Cited

U.S. PATENT DOCUMENTS

2006/0220631 A1\* 10/2006 Ito ........................... H02M 1/32
323/283
2012/0292985 A1   11/2012 Sakai
(Continued)

FOREIGN PATENT DOCUMENTS

EP          2556981 A2    2/2013
JP       2005073399 A    3/2005
(Continued)

OTHER PUBLICATIONS

International Search Report and Written Opinion (in Japanese with English Translation) for PCT/JP2015/000555, mailed Apr. 28, 2015; ISA/JP.

*Primary Examiner* — Karen Masih
(74) *Attorney, Agent, or Firm* — Harness, Dickey & Pierce, P.L.C.

(57) ABSTRACT

A motor drive device includes: an inverter circuit having a smoothing capacitor; a drive circuit portion which outputs an operation signal to the inverter circuit; a control portion which controls the drive circuit portion; and an operating voltage generation portion which supplies power to the drive circuit portion and the control portion by generating an operating voltage for the drive circuit portion and the control portion. The inverter circuit converts a DC voltage from a first power supply to an AC voltage and outputs the AC voltage to a multi-phase motor coil. The control portion outputs a signal to the drive circuit portion according to a command value from a high-level control device operating on power from a second power supply outputting a voltage lower than the first power supply. The operating voltage
(Continued)

generation portion is capable of generating the operating voltage using power fed from either of the first power supply and the second power supply.

8 Claims, 11 Drawing Sheets

(51) Int. Cl.
*B60L 15/12* (2006.01)
*H02P 27/08* (2006.01)
*B60L 1/00* (2006.01)
*B60L 3/00* (2006.01)
*B60L 11/14* (2006.01)
*B60L 11/18* (2006.01)
*B60L 15/00* (2006.01)
*B60L 15/20* (2006.01)
*H02P 31/00* (2006.01)

(52) U.S. Cl.
CPC ......... *B60L 11/1861* (2013.01); *B60L 15/007* (2013.01); *B60L 15/12* (2013.01); *B60L 15/20* (2013.01); *H02P 27/08* (2013.01); *H02P 31/00* (2013.01); *B60L 2210/10* (2013.01); *B60L 2210/40* (2013.01); *B60L 2220/14* (2013.01); *B60L 2240/421* (2013.01); *B60L 2240/423* (2013.01); *B60L 2240/525* (2013.01); *B60L 2270/46* (2013.01); *Y02T 10/644* (2013.01); *Y02T 10/645* (2013.01); *Y02T 10/70* (2013.01); *Y02T 10/705* (2013.01); *Y02T 10/7005* (2013.01); *Y02T 10/7044* (2013.01); *Y02T 10/7077* (2013.01); *Y02T 10/7216* (2013.01); *Y02T 10/7241* (2013.01); *Y02T 10/7275* (2013.01)

(56) References Cited

U.S. PATENT DOCUMENTS

| 2013/0033914 | A1 | 2/2013 | Yahata et al. |
| 2013/0200692 | A1 | 8/2013 | Viancino et al. |
| 2014/0176034 | A1 | 6/2014 | Matsumura et al. |

FOREIGN PATENT DOCUMENTS

| JP | 2011234507 A | 11/2011 |
| JP | 2012244651 A | 12/2012 |
| JP | 2013055822 A | 3/2013 |
| JP | 2013225968 A | 10/2013 |
| JP | 2013236442 A | 11/2013 |
| JP | 2013236456 A | 11/2013 |
| WO | WO-2013018209 A1 | 2/2013 |

* cited by examiner

MOTOR DRIVE DEVICE

CROSS REFERENCE TO RELATED APPLICATIONS

This application is a U.S. National Phase Application under 35 U.S.C. 371 of International Application No. PCT/JP2015/000555 filed on Feb. 6, 2015 and published in Japanese as WO 2015/129171 A1 on Sep. 3, 2015. This application is based on and claims the benefit of priority from Japanese Patent Application No. 2014-037043 filed on Feb. 27, 2014. The entire disclosures of all of the above applications are incorporated herein by reference.

TECHNICAL FIELD

The present disclosure relates to a motor drive device that drives a motor using an inverter circuit.

BACKGROUND ART

A motor drive device described in Patent Literature 1 drives a motor by converting a DC voltage to an AC voltage by PWM control using switching of switching elements of an inverter circuit and by outputting the AC voltage to a motor coil. The motor drive device has a drive circuit portion which drives the switching elements by outputting an operation signal to the inverter circuit and a control portion which makes the switching elements switch by controlling the drive circuit portion by PWM. When the motor is stopped, the control portion performs a discharge control to discharge charges remaining in a smoothing capacitor of the inverter circuit. The motor drive device configured as above is installed to a vehicle, and power is supplied to the control portion from a low-voltage power supply, for example, at 12 V while power is supplied to the drive circuit portion from a high-voltage power supply, for example, at 200 to 400 V.

PRIOR ART LITERATURES

Patent Literature

Patent Literature 1: JP 2011-234507 A

SUMMARY OF INVENTION

The motor drive device configured as above, however, fails to quickly perform a discharge operation from the smoothing capacitor of the inverter circuit when the motor is stopped in a circumstance where a supply of power from the low-voltage power supply to the control portion stops, for example, in the event of a collision of the vehicle.

The present disclosure has an object to provide a motor drive device capable of quickly performing a discharge operation from a smoothing capacitor when a motor is stopped even in a circumstance where a supply of power from at least one of two power supplies stops.

To attain the above object, according to an aspect of the present disclosure, a motor drive device includes an operating voltage generation portion that supplies power to a drive circuit portion and a control portion by generating an operating voltage for the drive circuit portion and the control portion. The inverter circuit converts a DC voltage from a first power supply to an AC voltage by PWM control by switching the switching elements and outputs the AC voltage to the multi-phase motor coil. The control portion outputs a PWM signal to the drive circuit portion according to a drive state command value of the motor output from a high-level control device that operates on power from a second power supply outputting a voltage lower than the first power supply. The operating voltage generation portion is capable of generating the operating voltage using power fed from either of the first power supply and the second power supply.

The operating voltage generation portion is thus capable of generating an operating voltage of the drive circuit portion and the control portion using power from either of the first power supply and the second power supply. That is to say, the operating voltage generation portion is capable of supplying power to the drive circuit portion and the control portion using power from either of the first power supply and the second power supply. Hence, when a supply of power from one of the first power supply and the second power supply stops, power can be supplied to the drive circuit portion and the control portion from the other one of the first power supply and the second power supply. When a supply of power from both of the first power supply and the second power supply stops, power can be supplied to the drive circuit portion and the control portion using power from the smoothing capacitor in which charges are stored. In the manner as above, even when a supply of power from at least one of the first power supply and the second power supply stops, power can be supplied to the drive circuit portion and the control portion. Consequently, even in a circumstance where a supply of power from at least one of two power supplies stops, the smoothing capacitor can be discharged quickly, when the motor is stopped, by operating the drive circuit portion and the control portion.

DESCRIPTION OF EMBODIMENTS

Figure 1:
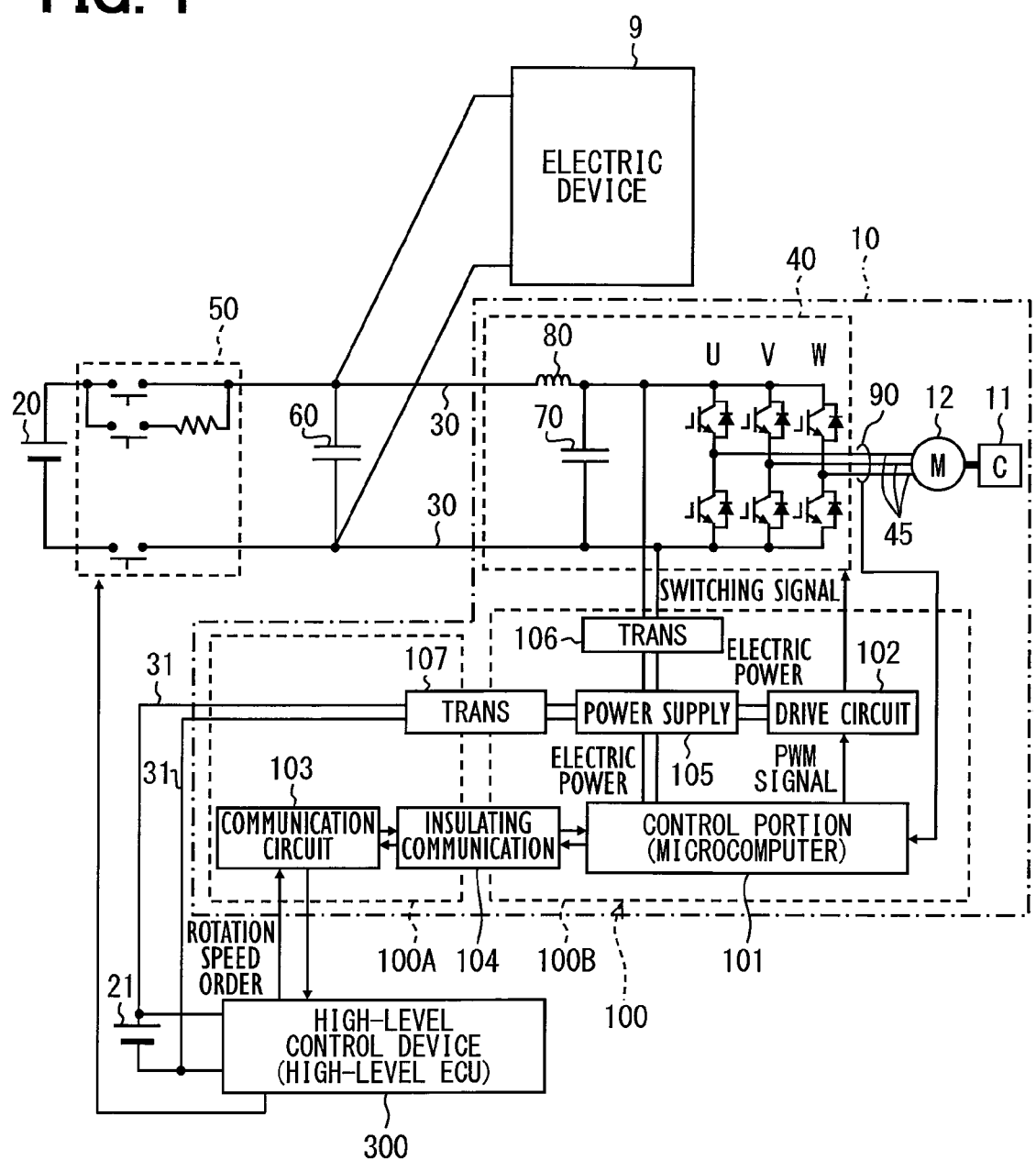
FIG. 1 is a circuit diagram, partly a block diagram, of a motor drive device of a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment is described with reference to FIGS. 1-4.

As is shown in FIG. 1, a motor drive device of this embodiment drives a synchronous motor 12 in an electric compressor 10. The synchronous motor 12 is a high-voltage electric motor and corresponds to a motor of this embodiment. The electric compressor 10 is a compressor provided in a heat pump cycle of an air conditioning device for a vehicle using refrigerant such as carbon dioxide, and drives a compression mechanism 11 as a load using the internal synchronous motor 12.

The electric compressor 10 compresses a gas-phase refrigerant and discharges the compressed refrigerant in the compression mechanism 11. For example, in a case where the refrigerant is a carbon dioxide refrigerant, the compression mechanism 11 discharges the refrigerant compressed to or above a critical pressure. The synchronous motor 12 of this embodiment is, for example, a synchronous motor having a 3-phase 4-pole coil to rotary drive a magnet-embedded rotor.

A DC power supply 20 shown in FIG. 1 is a feed source of a DC voltage including a high-voltage battery capable of outputting a voltage, for example, of 288 V. The DC power supply 20 corresponds to a first power supply of this embodiment. A pair of buses 30 extending from the DC power supply 20 to an inverter circuit 40 is provided with a high-voltage relay system 50. The high-voltage relay system 50 includes multiple relays and a resistor. The high-voltage relay system 50 is furnished with a function of preventing a rush current from flowing into the buses 30 when a high voltage is applied by starting a voltage application through a path having the resistor and later switching the path to a path having no resistor.

The high-voltage relay system 50 cuts off a feed path when an abnormal state is detected in the electric compressor 10 and the like.

As is shown in FIG. 1, smoothing capacitors 60 and 70 are interposed between the buses 30 which is a power supply path from the DC power supply 20 to the inverter circuit 40. The capacitor 60 is provided so as to smooth a voltage which varies due to an influence of another electric device 9 connected to the buses 30 in parallel with the inverter circuit 40. The electric device 9 can be a vehicle-running motor drive device, a charge device, a step-down DC-to-DC conversion device, and the like.

Assume that multiple motor drive devices are installed to a vehicle and the electric device 9 is the vehicle-running motor drive device. Then, the electric device 9 is a main drive device in the motor drive devices fed from the DC power supply 20 and a drive device including the inverter circuit 40 is a subsidiary drive device. The main drive device referred to herein means, for example, a device to which larger input power is fed from the DC power supply 20 than the subsidiary drive device. Also, when it is difficult to feed power to the both drive devices, the main drive device is the device to which power is fed preferentially.

In a case where input power to the electric device 9 is, for example, ten times as high as or higher than input power to the electric compressor 10 via the inverter circuit 40, a voltage applied to the inverter circuit 40 from the DC power supply 20 via the buses 30 often fluctuates noticeably due to an influence of the electric device 9. The capacitor 60 is provided so as to restrict such a voltage fluctuation.

The inverter circuit 40 has the capacitor 70 which is a smoothing capacitor provided in parallel with switching elements. The capacitor 70 is provided so as to absorb a surge and a ripple occurring when the switching elements of the inverter circuit 40 switch. The capacitor 70 is a capacitor having a relatively small capacitance and therefore contributes to a reduction of a physical size of components.

A coil 80 is provided between connection points of the capacitor 60 and the capacitor 70 to one bus 30. The coil 80 is provided so as to restrict interference of the two capacitors 60 and 70 provided in parallel between the buses 30. The coil 80 is provided with the purpose to change a resonance frequency induced by a relation of the capacitor 60 and the capacitor 70. The capacitor 70 as a capacitor element and the coil 80 as a coil element together form so-called an LC filter circuit.

The coil 80 is so-called a normal coil. The coil 80 may be a coil component of a line connecting the capacitor 60 and the capacitor 70. Alternatively, so-called a common coil may be interposed between the capacitor 60 and the capacitor 70.

The inverter circuit 40 includes arms of three phases U, V, and W corresponding to a stator coil of the synchronous motor 12. The inverter circuit 40 converts a DC voltage inputted via the buses 30 to an AC voltage by pulse width modulation (PWM) control and outputs the resulting AC voltage.

The U-phase arm is formed by serially connecting an upper arm in an upper row in the drawing made up of a switching element and a free wheel diode connected in anti-parallel and a lower arm in a lower row in the drawing also made up of a switching element and a diode connected in anti-parallel. An output line 45 extending from a connection portion of the upper arm and the lower arm of the U-phase arm is connected to the motor coil. The V-phase arm and the W-phase arm are formed of the switching elements and the diodes in the same manner as above and the output lines 45 extending from respective connection points of the upper arms and the lower arms are connected to the motor coil.

The switching element is, for example, an IGBT (Insulated Gate Bipolar Transistor). Further, the arm made up of the switching element and the diode may be a switching element, for example, an RCIGBT (Reverse Conducting Insulated Gate Bipolar Transistor) which is a power semiconductor having an IGBT and a reverse conducting diode integrated into one chip.

A current detection device 90 is provided to the output lines 45 so as to detect a current flowing through the output line(s) 45 of one or more than one phase. The current detection device 90 can adopt a current transformer method, a hall element method, a shunt resistor method, and so on. The current detection device 90 outputs detected current information to a control portion 101 of a control device 100.

A voltage detection device is provided between the buses 30 and detects a voltage between the buses 30, for example, at a region at which the capacitor 70 is connected. The voltage detection device can adopt a resistance voltage divider method. The voltage detection device outputs detected voltage information to the control portion 101.

The inverter circuit 40 is provided with a thermistor as an example of temperature detection means for detecting a temperature of the switching elements. The element temperature detected by the thermistor is outputted to the control portion 101.

The control device 100 as control means controls the driving of the synchronous motor 12 by controlling switching operations of the respective switching elements of the inverter circuit 40. The control device 100 generates a PWM wave as a switching signal according to information on motor coil current values and the like inputted therein, and outputs the PWM wave to the inverter circuit 40.

The control device 100 has the control portion 101, a drive circuit portion 102, a communication circuit 103, an insulating communication portion 104, a power-supply circuit 105, a transformer 106, and another transformer 107. The communication circuit 103 is included in a low-voltage control device 100A operating on a low voltage as a basic voltage and disposed in a low voltage region. The control portion 101, the drive circuit portion 102, the power-supply circuit 105, and the transformer 106 are included in a high-voltage control device 100B operating on a high voltage as a basic voltage and disposed in a high voltage region. The insulating communication portion 104 and the transformer 107 are disposed so as to bridge between the low-voltage control device 100A and the high-voltage control device 100B.

The control portion 101 includes, for example, a microcomputer or an exclusive-use IC as hardware. The control portion 101 communicates with a high-level control device 300, inputs detection signals from various detection devices after converting the signals from analog to digital, and outputs a drive signal to the drive circuit portion 102. The control portion 101 outputs a PWM signal as a drive signal to the drive circuit portion 102 according to a rotation speed command value, which is an example of a drive state command value of the synchronous motor 12 from the high-level control device 300.

The drive circuit portion 102 is so-called a drive driver which generates a switching signal to switch the switching elements of the inverter circuit 40 on the basis of the drive signal from the control portion 101. The drive circuit portion 102 drives the switching elements by outputting an operation signal to the inverter circuit 40. The control portion 101 makes the switching elements switch by controlling the drive circuit portion 102 by PWM.

The communication circuit 103 is a circuit to enable communications between the high-level control device 300 and the control portion 101. The communication circuit 103 enables communications using, for example, a serial communication, a LIN (Local Interconnect Network) communication, a CAN (Controller Area Network) (registered trademark) communication, and so on.

The insulating communication portion 104 is insulating communication means for enabling communications between the communication circuit 103 in the low-voltage control device 100A and the control portion 101 in the high-voltage control device 100B while electrically isolating one from the other. The insulating communication portion 104 enables communications while providing electrical insulation with light or magnetism by using, for example, a photo-coupler or a semiconductor isolator.

The power-supply circuit 105 generates power-supply power supplied to the control portion 101 and the drive circuit portion 102 using power supplied from the transformer 106 and the transformer 107. The power-supply circuit 105 generates a voltage, for example, of 5 V or 15 V as an operating voltage of the control portion 101 and the drive circuit portion 102. The power-supply circuit 105, the transformer 106, and the transformer 107 correspond to an operating voltage generation portion of this embodiment.

The power-supply circuit 105 has communication means for outputting information to inform the control portion 101 whether power is supplied from a DC power supply 21 via a harness 31 on the basis of information on a voltage supplied from the transformer 107. The power-supply circuit 105 does not necessarily include the communication means configured to output the information from the power-supply circuit 105, and the power-supply circuit 105 may include a wiring configuration or the like capable obtaining the information from the control portion 101.

The transformer 106 is voltage conversion means for applying voltage conversion to power from the high-voltage DC power supply 20 and supplying the converted power to the power-supply circuit 105. As with the transformer 107, the transformer 106 can be, for example, an insulting transformer converter. The transformer 106, however, is not limited to an insulating type and may be of a non-insulating type. For example, a non-insulating choke converter is also available as the transformer 106.

The transformer 107 is voltage conversion means for applying voltage conversion to power from the low-voltage DC power supply 21 and supplying the converted power to the power-supply circuit 105. The transformer 107 can be, for example, an insulating transformer converter.

Figure 3:
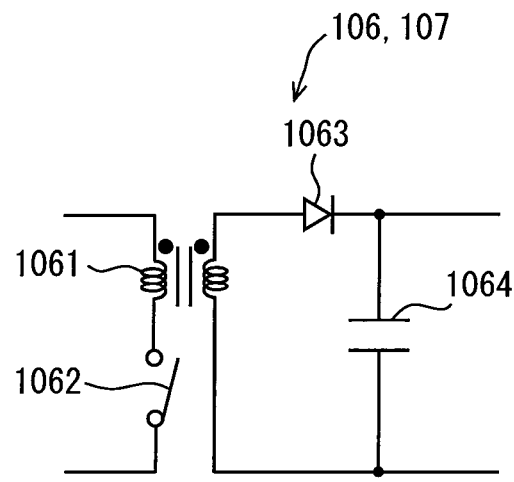
FIG. 3 is a view schematically showing a configuration of a transformer.

The transformer 106 and the transformer 107 can be a voltage conversion device of a configuration shown, for example, in FIG. 3. Each of the transformer 106 and the transformer 107 has a transformer portion 1061, a switching device 1062, a diode portion 1063, and a capacitor portion 1064. The switching device 1062 can be, for example, a MOS field effect transistor.

A voltage level generated by the transformer 106 and the transformer 107 is set according to the number of windings of the transformer portion 1061 and a switching duty of the switching device 1062. A power input side of the transformer 106 is connected to the buses 30. The transformer 106 therefore applies voltage conversion to power supplied from the buses 30. On the other hand, the harness 31 is connected to a power input side of the transformer 107. The transformer 107 therefore applies voltage conversion to power supplied from the DC power supply 21 via the harness 31.

Hereinafter, a power supply system from the buses 30 via the transformer 106 is occasionally referred to as the high voltage system and a power supply system from the harness 31 via the transformer 107 is occasionally referred to as the low voltage system.

As is obvious from FIG. 1, the configuration including the inverter circuit 40 and the control device 100 is the motor drive device of this embodiment which drives the synchronous motor 12 by supplying power to the synchronous motor 12.

The DC power supply 21 is a feed source of a DC voltage different from the DC power supply 20 and includes a battery capable of outputting a voltage, for example, of 12 V. The DC power supply 21 corresponds to a second power supply of this embodiment outputting a voltage lower than the DC power supply 20.

The high-level control device 300 is, for example, a high-level ECU which controls a vehicle. The high-level control device 300 operates on power from the DC power supply 21 and controls, for example, the electric device 9. The high-level control device 300 outputs information on an operation state command to the control portion 101 via the communication portion 103 and the insulating communication portion 104 and obtains information from the control portion 101. The high-level control device 300 outputs, for example, a rotation speed command value of the electric compressor 10 to the control portion 101. The high-level control device 300 controls the high-voltage relay system 50 to switch ON and OFF.

Figure 2:
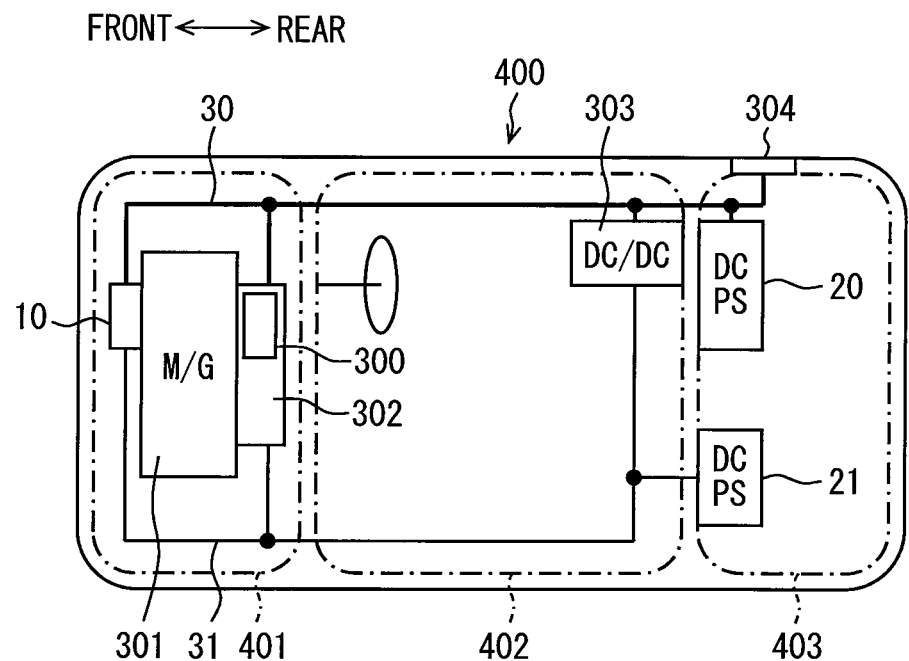
FIG. 2 is a schematic top view indicating positions in a vehicle at which an electric compressor including the motor drive device and configurations connected to the electric compressor are installed.

The electric compressor 10, the DC power supply 20 corresponding to the first power supply, the DC power supply 21 corresponding to the second power supply, the high-level control device 300, and so on are installed, for example, to a vehicle 400 as shown in FIG. 2. The vehicle 400 shown in FIG. 2 by way of example is an electric car having an electric motor as a running drive source or a hybrid car using an electric motor and an internal combustion engine as a running drive source.

The electric compressor 10 is installed in an engine room 401 in a front part of the vehicle 400 and disposed, for example, in front of a motor generator 301. In the case of an electric car, the engine room 401 is occasionally called a motor room. In the engine room 401, a drive device 302 of the motor generator 301 is provided behind the motor generator 301 side by side. The high-level control device 300 is disposed inside the drive device 302.

The DC power supply 20 and the DC power supply 21 are disposed in a luggage compartment 403 in a rear part of the vehicle 400 at a relatively front position closer to a cabin 402. A DC-to-DC converter 303 is interposed between the buses 30 in the high voltage system extending from the DC power supply 20 and a charge port 304 and the harness 31 in the low voltage system extending from the DC power supply 21. The DC-to-DC converter 303 is disposed in the cabin 402 at a center in a front-rear direction of the vehicle 400 at a relatively rear position closer to the luggage compartment 403. The DC power supply 20, the DC power supply 21, and the DC-to-DC converter 303 are disposed under the floor in the luggage compartment 403, inside the cabin 402, or under the floor in the cabin 402 in some cases.

As has been described, the various components are installed to the vehicle 400, and as is shown in FIG. 2, the buses 30 and the harness 31 are provided in side parts and the front part of the vehicle and extend along an exterior panel of the vehicle body. Hence, in a case where the vehicle 400 is damaged, for example, by a collision, at least one of the buses 30 and the harness 31 probably breaks. In particular, in a case where the front part of the vehicle 400 is damaged, for example, by an off-set collision, either the buses 30 or the harness 31 may break while the electric compressor 10 is capable of operating normally.

In the event of a collision of the vehicle, the control portion 101 of the electric compressor 10 performs so-called an active discharge control, which is a discharge control when a motor is stopped (hereinafter, referred to as the stop-discharge control) to quickly discharge charges charged in the capacitor 70 of the inverter circuit 40.

Figure 4:
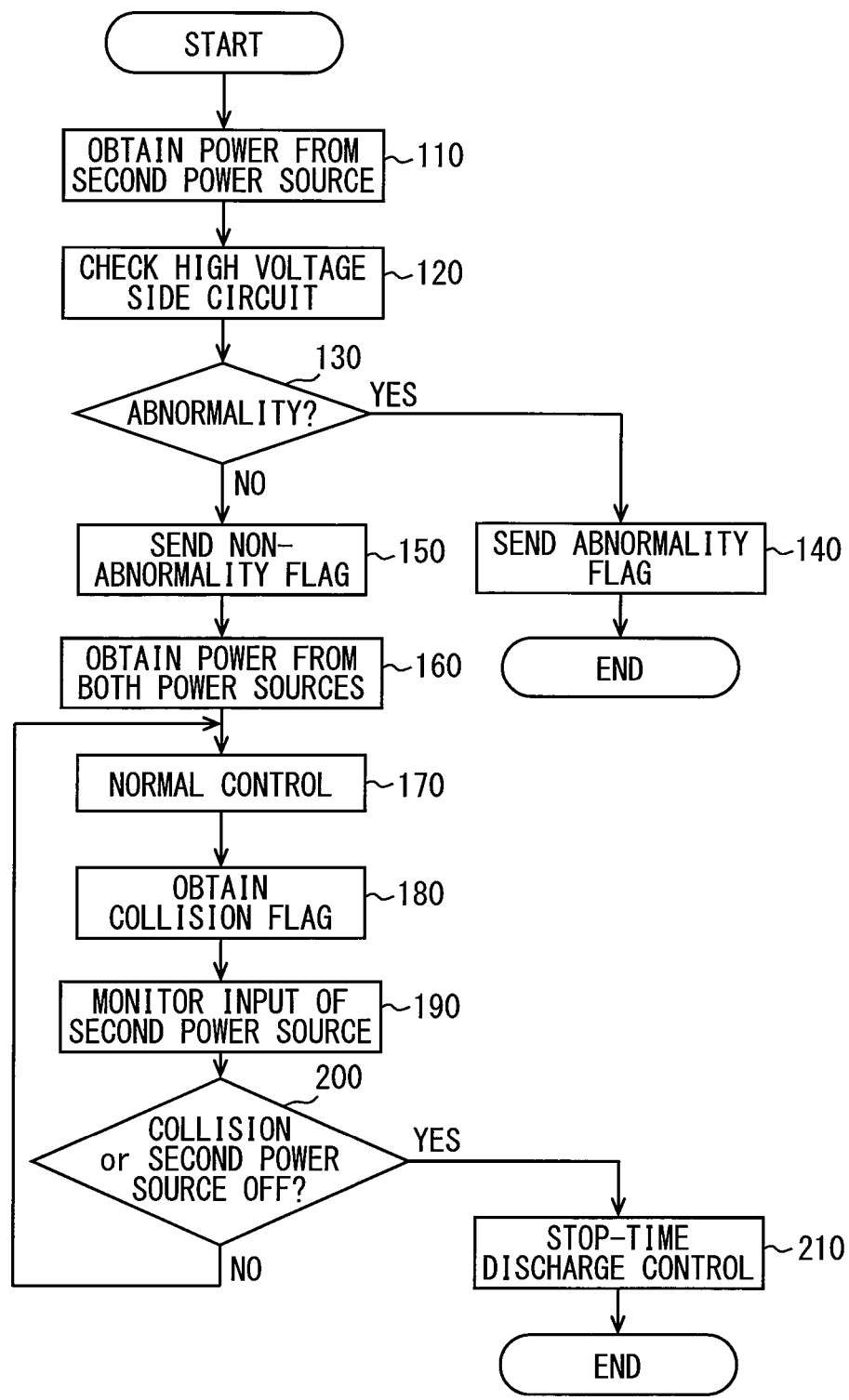
FIG. 4 is a flowchart depicting an outline of a control operation by a control portion of the first embodiment.

A control operation of the electric compressor 10 including the stop-discharge control performed by the control portion 101 will now be described in outline with reference to FIG. 4.

When a switch to set the vehicle 400 to a ready-to-run state is turned ON, the control portion 101 first obtains power from the DC power supply 21 (Step 110). In Step 110, power after voltage conversion in the transformer 107 is obtained from the power-supply circuit 105. After Step 110, the control portion 101 checks the circuit on the high voltage side using power obtained from the DC power supply 21 as operation power (Step 120). In Step 120, a voltage applied to a circuit, such as the inverter circuit 40, from the DC power supply 20 and a current flowing through the circuit are detected.

After Step 120, the control portion 101 determines whether the detected voltage or current has an abnormality (Step 130). When the control portion 101 determines in Step 130 that an abnormality is present, the control portion 101 sends an abnormality flag to the high-level control device 300 (Step 140) and ends the control. Upon receipt of the abnormality flag, the high-level control device 300 notifies a user of the abnormality, for example, by lighting a warning lamp. It should be appreciated, however, that a control operation of the high-level control device 300 upon receipt of the abnormality flag is not limited to the above operation.

When the control portion 101 determines in Step 130 that an abnormality is absent, the control portion 101 sends a non-abnormality flag to the high-level control device 300 (Step 150) and obtains power from the DC power supply 20 (Step 160). In Step 160, power from the DC power supply 20 after voltage conversion in the transformer 106 and power from the DC power supply 21 after voltage conversion in the transformer 107 are obtained from the power-supply circuit 105.

After power from the both DC power supplies 20 and 21 is obtained in Step 160, the control portion 101 performs a normal operation control of the electric compressor 10 (Step 170). In Step 170, a rotation speed command value of the synchronous motor 12 in the electric compressor 10 from the high-level control device 300, motor coil current information detected in the current detection device 90, information on a voltage between the buses 30, and so on are inputted into the control portion 101. On the basis of the input information, the control portion 101 determines a voltage command to control the synchronous motor 12 without using a position sensor, generates a PWM signal, and outputs the PWM signal to the drive circuit portion 102. The drive circuit portion 102 generates a PWM wave as a switching signal according to the PWM signal inputted therein and outputs the PWM wave to the inverter circuit 40.

While the control portion 101 continues to perform Step 170, the control portion 101 obtains a collision flag (Step 180), which is information on a collision of the vehicle sent from the high-level control device 300. The control portion 101 further monitors a voltage application state from the DC power supply 21 to the transformer 107 via the harness 31 (Step 190). The control portion 101 determines whether the collision flag obtained in Step 180 is ON and whether the voltage application state detected in Step 190 is an OFF state (Step 200).

When the control portion 101 determines in Step 200 that the collision flag is OFF and the voltage application state from the DC power supply 21 is an ON state, the control portion 101 returns to Step 170 and repeats Step 170 and subsequent steps including the normal operation control. When the control portion 101 determines in Step 200 that the collision flag is ON or the voltage application state from the DC power supply 21 is an OFF state, the control portion 101 performs the stop-discharge control (Step 210).

In Step 210, the control portion 101 performs the stop-discharge control to discharge charges remaining in the capacitor 70. The discharge control is performed as at least a part of a stop control to stop the synchronous motor 12.

When the voltage application state from the DC power supply 21 is an OFF state because, for example, the harness 31 breaks, the control portion 101 performs Step 210 using power supplied from the buses 30. When power is supplied to the buses 30 from the DC power supply 20, the control portion 101 performs Step 210 using power supplied from the DC power supply 20 and discharge power of the capacitor 70. When a feed path from the DC power supply 20 is cut off because the buses 30 break or the high-voltage relay system 50 is opened, the control portion 101 performs Step 210 using discharge power of the capacitor 70.

When the voltage application state from the DC power supply 21 is an ON state and the collision flag is ON, the control portion 101 performs Step 210 using power supplied from the DC power supply 21 and power supplied from the buses 30.

During the stop-discharge control, the control portion 101 controls the inverter circuit 40 to operate in such a manner that at least either a loss caused by a switching operation of the inverter circuit 40 or a loss caused by the synchronous motor 12 is increased from a loss during the normal operation. That is to say, the capacitor 70 is discharged by controlling an operation of the inverter circuit 40 so as to generate a relatively large loss and the synchronous motor 12 is stopped.

For example, in a case where the capacitor 70 is discharged by a loss caused by a switching operation of the inverter circuit 40 alone, charges can be discharged satisfactorily by controlling the switching operation so as not generate a torque of the synchronous motor 12. Alternatively, the capacitor 70 can be discharged by controlling a switching operation of the inverter circuit 40 to generate, for example, a white-noise motor current.

Further, during the stop-discharge control, the control portion 101 may perform a control to generate a torque of the synchronous motor 12 within a range of a predetermined rotation speed of the synchronous motor 12 as a control by which discharge is performed preferentially. By controlling a rotation speed of the synchronous motor 12 to be as high as or lower than the predetermined speed, an influence of an inductive voltage accompanying rotations given to discharge of the capacitor 70 can be restricted.

Also, during the stop-discharge control, the control portion 101 may perform a control to increase power consumed by the inverter circuit 40 and a configuration disposed in the high-voltage control device 100B. For example, the control portion 101 formed of a microcomputer may perform a control to change its setting to a mode in which power is consumed to a maximum extent. Alternatively, the control portion 101 may control an operation of the inverter circuit 40 so as to increase reactive power. When the control portion 101 performs the discharge control operation, it is preferable to increase power consumed by at least any one of the inverter circuit 40, the drive circuit portion 102, the control portion 101, and the operating voltage generation portion compared with power consumed before the discharge control operation begins.

After the control portion 101 performed Step 210 and therefore the capacitor 70 is discharged and the synchronous motor 12 is stopped, the control portion 101 ends the control of the electric compressor 10.

According to the configuration and the operation described above, the motor drive device of this embodiment includes the power-supply circuit 105 and the transformers 106 and 107 as the operating voltage generation portion which supplies power to the drive circuit portion 102 and the control portion 101 by generating an operating voltage for the drive circuit portion 102 and the control portion 101. The operating voltage generation portion is capable of generating an operating voltage for the drive circuit portion 102 and the control portion 101 using power fed from either of the DC power supply 20 and the DC power supply 21.

The operating voltage generation portion is thus capable of generating an operating voltage for the drive circuit portion 102 and the control portion 101 using power from either of the DC power supply 20 and the DC power supply 21. That is to say, the operating voltage generation portion is capable of supplying power to the drive circuit portion 102 and the control portion 101 using power from either of the DC power supply 20 and the DC power supply 21. Hence, when a supply of power from one of the DC power supply 20 and the DC power supply 21 stops, power from the other one of the DC power supply 20 and the DC power supply 21 can be supplied to the drive circuit portion 102 and the control portion 101. Also, when a supply of power from both of the DC power supply 20 and the DC power supply 21 stops, power can be supplied to the drive circuit portion 102 and the control portion 101 from the capacitor 70 in which charges are stored. Accordingly, even when a supply of power from at least one of the DC power supply 20 and the DC power supply 21 stops, power can be supplied to the drive circuit portion 102 and the control portion 101. In the manner described above, even in a circumstance where a supply of power from at least one of two power supplies stops, the capacitor 70 can be discharged quickly when the synchronous motor 12 is stopped by operating the drive circuit portion 102 and the control portion 101.

At least during a normal operation, the operating voltage generation portion supplies as much power as a total of power consumed by the drive circuit portion 102 and the control portion 101 from at least either the DC power supply 20 or the DC power supply 21. The operating voltage generation portion is thus capable of supplying power supplied from at least either the DC power supply 20 or the DC power supply 21 as power consumed by the drive circuit portion 102 and the control portion 101.

Herein, the operating voltage generation portion provides as much power as a total of power consumed by the drive circuit portion 102 and the control portion 101 using power supplied from both of the DC power supply 20 and the DC power supply 21 during a normal operation. Preferably, a ratio of power supplied from the DC power supply 20 and the DC power supply 21 may be set in advance so as to obtain most satisfactory conversion efficiency. When a ratio is set as above, power consumption can be saved in a reliable manner.

The operating voltage generation portion is not limited to the example described above. It may be configured in such a manner that power consumed by the drive circuit portion 102 is supplied from the DC power supply 20 and power consumed by the control portion 101 is supplied from the DC power supply 21.

When configured as above, the operating voltage generation portion becomes capable of supplying power supplied from the DC power supply 20 as power consumed by the drive circuit portion 102. Also, the operating voltage generation portion becomes capable of supplying power supplied from the DC power supply 21 as power consumed by the control portion 101.

Consequently, both of the transformer 106 which transforms a voltage across the DC power supply 20 to an operating voltage of the drive circuit portion 102 and the transformer 107 which transforms a voltage across the DC power supply 21 to an operating voltage of the control portion 101 can be relatively small.

The control portion 101 performs the discharge control operation to discharge charges from the capacitor 70 when the synchronous motor 12 is stopped. The control portion 101 is thus capable of performing the discharge control operation to quickly discharge the capacitor 70 when the synchronous motor 12 is stopped even in a circumstance where a supply of power from at least one of the DC power supply 20 and the DC power supply 21 stops.

The control portion 101 controls the operating voltage generation portion in such a manner that the control portion 101 performs the discharge control operation using power supplied from the buses 30 which feed power from the DC power supply 20 to the inverter circuit 40. The control portion 101 is thus capable of performing the discharge control operation using power from at least either the DC power supply 20 or the capacitor 70 even when feeding from the DC power supply 21 stops or communications with the high-level control device 300 are disabled.

When the control portion 101 performs the discharge control operation, the control portion 101 is capable of increasing power consumed by at least one of the inverter circuit 40, the drive circuit portion 102, the control portion 101, and the operating voltage generation portion compared with power consumed before the discharge control operation beings.

The control portion 101 therefore performs the discharge control operation by increasing power consumed by at least one of the inverter circuit 40, the drive circuit portion 102, the control portion 101, and the operating voltage generation portion to which power is supplied from at least either the DC power supply 20 or the capacitor 70. The control portion 101 is thus capable of discharging the capacitor 70 quickly in a reliable manner.

A load driven by the synchronous motor 12 is the compression mechanism 11 which draws in and compresses a refrigerant in a refrigeration cycle installed to a vehicle.

In the electric compressor 10 configured to drive the compression mechanism 11 by the synchronous motor 12, even in a circumstance where a supply of power from at least one of two power supplies stops, the capacitor 70 can be discharged quickly when the synchronous motor 12 is stopped by operating the drive circuit portion 102 and the control portion 101.

The electric compressor 10 is an integral machine, and even when either the buses 30 or the harness 31 breaks, for example, by a collision of the vehicle, the electric compressor 10 seldom loses own capabilities. Hence, even in a circumstance where a supply of power from at least one of two power supplies stops, the capacitor 70 can be discharged quickly when the synchronous motor 12 is stopped by operating the drive circuit portion 102 and the control portion 101.

According to the motor drive device of this embodiment, the entire configurations using high-speed signals, such as the control portion 101 and the drive circuit portion 102, are disposed in the high-voltage control device 100B in the control device 100. Accordingly, a need to send high-speed signals exchanged between the control portion 101 and the drive circuit portion 102 through an electrical insulating structure is eliminated. Consequently, the control device 100 can be made smaller relatively easily.

The control portion 101 disposed in the high-voltage control device 100B is capable of operating on power supplied from the low-voltage DC power supply 21 alone. Hence, communications with the high-level control device 300 and the like are enabled without a supply of power from the DC power supply 20.

The control portion 101 and the drive circuit portion 102 are capable of operating on power supplied from the high-voltage DC power supply 20 alone in the event of abnormality, such as a collision of the vehicle.

A supply of power from the DC power supply 20 and a supply of power from the DC power supply 21 can be controlled by preliminarily setting the operating voltage generation portion so as to obtain relatively high conversion efficiency in order to save power consumption in a reliable manner.

In a comparative example where an operating voltage is generated from the low-voltage system alone, charges are hardly discharged from the smoothing capacitor when the harness is cut by a collision of the vehicle. In contrast, in a case where an operating voltage is also generated from the high-voltage system as in the case herein, charges are readily discharged from the smoothing capacitor.

A problem arising when discharge is performed by generating an operating voltage from the low-voltage system alone is solved by constantly performing discharge using a discharge resistor consuming a small amount of current. The method, however, raises another problem in terms of efficiency and heat generation. Any of such problems, however, is not raised in the case described herein. A normally-on element may be used in order to perform discharge without a supply of power from the low-voltage system. However, the number of components and the cost are increased. In contrast, the case described herein can prevent an increase of the number of components and the cost.

In a comparative case where an operating voltage is generated from the high-voltage system alone, an accessory mode and an ignition mode are set in the vehicle and communications with the high-level control device are disabled while a voltage is applied from the low-voltage system alone. Such a problem, however, does not occur in the embodiment described herein. The accessory mode referred to herein means a mode in which electrical components, such as an accessory socket, are set available. The ignition mode referred to herein means a mode in which the vehicle is set in a ready-to-run state.

When an operating voltage is generated from the high-voltage system alone, it is rather difficult to detect an abnormality and operate the control device safely. A configuration to detect an abnormality may be additionally provided. However, the number of components and the cost are likely to increase significantly. It should be noted that such problems do not occur in the embodiment described herein, either.

As has been described, the motor drive device configured to be capable of supplying power from both of the low-voltage system and the high-voltage system as in the embodiment described herein is relatively inexpensive and can be smaller. Hence, the motor drive device is capable of performing an operation stably and safely during a normal operation and in the event of an abnormality, such as a collision of the vehicle.

Second Embodiment

A second embodiment will now be described according to FIG. 5.

The second embodiment is different from the first embodiment above in that operation power is preferentially fed from a high-voltage system after a boot sequence. Portions same as the portions of the first embodiment above are labeled with same reference numerals and a description is omitted herein. Configurations labeled with reference numerals same as the reference numerals used in the drawings referred to in the first embodiment above and other configurations which are not described in the second embodiment are the same as the configurations of the first embodiment above and exert the same function and effect.

Figure 5:
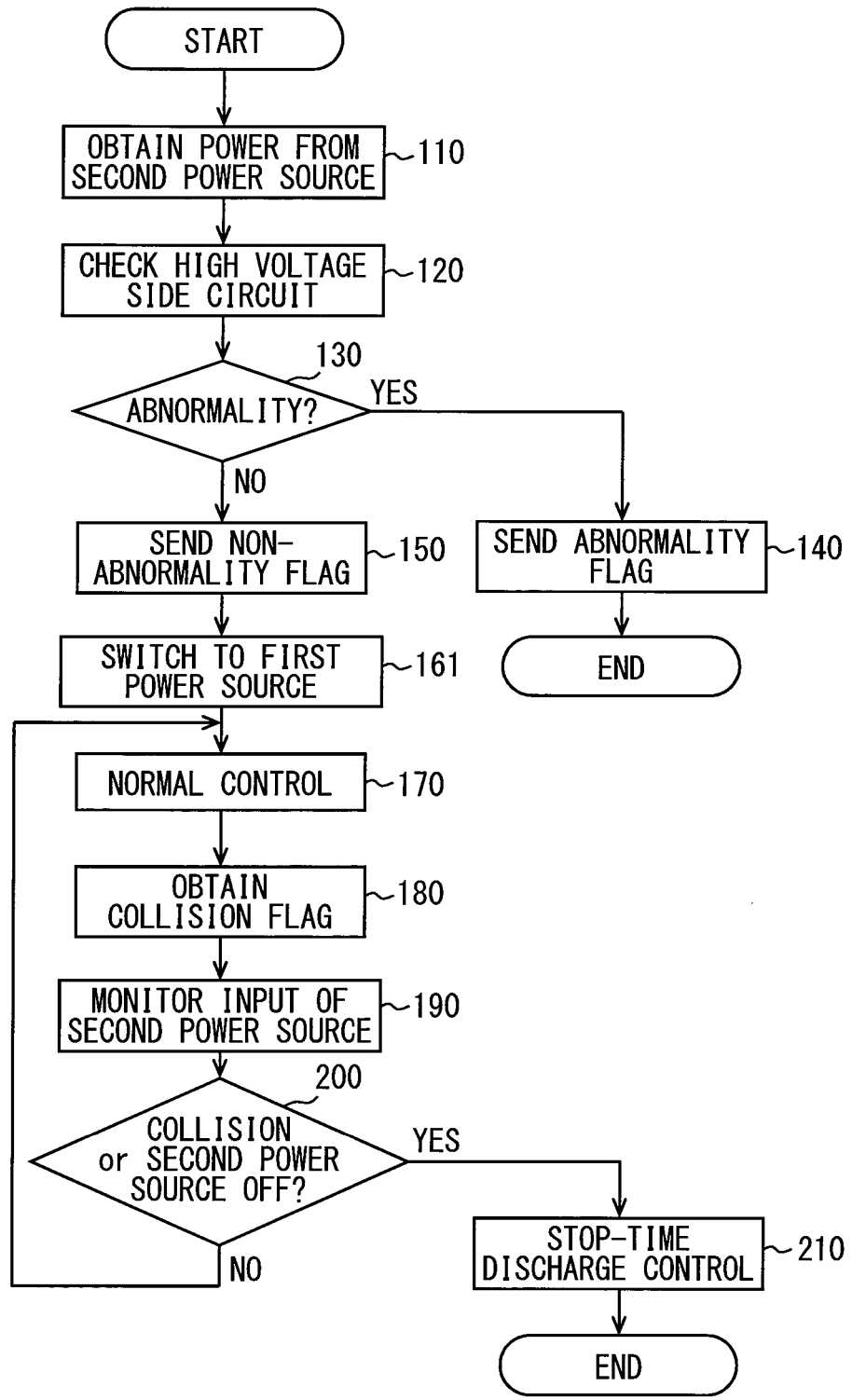
FIG. 5 is a flowchart depicting an outline of a control operation by a control portion of a second embodiment.

As is shown in FIG. 5, in this embodiment, after a control portion 101 performed Step 150, the control portion 101 obtains power from a DC power supply 20 and stops obtaining power from a DC power supply 21 (Step 161). That is to say, in Step 161, power being obtained is switched from power from the DC power supply 21 after voltage conversion in a transformer 107 to power from the DC power supply 20 after voltage conversion in a transformer 106. Subsequently, the control portion 101 performs Step 170 and subsequent steps.

The control portion 101 performs a stop-discharge control in Step 210 using power supplied from buses 30. When power is supplied to the buses 30 from the DC power supply 20, the control portion 101 performs Step 210 using power supplied from the DC power supply 20 and discharge power of a capacitor 70. When a feed path from the DC power supply 20 is cut off because the buses 30 break or a high-voltage relay system 50 is opened, the control portion 101 performs Step 210 using discharge power of the capacitor 70.

According to this embodiment, at least during a normal operation, the control portion 101 controls an operating voltage generation portion to supply as much power as a total of power consumed by a drive circuit portion 102 and the control portion 101 from the DC power supply 20. Even when power can be fed to the operating voltage generation portion from both of the high-voltage system and a low-voltage system, power is fed preferentially from the high-voltage system.

The operating voltage generation portion is thus capable of supplying power supplied from the DC power supply 20 as power consumed by the drive circuit portion 102 and the control portion 101. Hence, the transformer 107 which transforms a voltage across the DC power supply 21 to an operating voltage of the drive circuit portion 102 and the control portion 101 can be made smaller in a reliable manner.

Third Embodiment

A third embodiment will now be described according to FIG. 6.

The third embodiment is different from the second embodiment above in a part of a feed system when a stop-discharge control is performed. Portions same as the portions of the first and second embodiments above are labeled with same reference numerals and a description is omitted herein. Configurations labeled with reference numerals same as the reference numerals used in the drawings referred to in the first and second embodiments above and other configurations which are not described in the third embodiment are the same as the configurations of the first and second embodiments above and exert the same function and effect.

Figure 6:
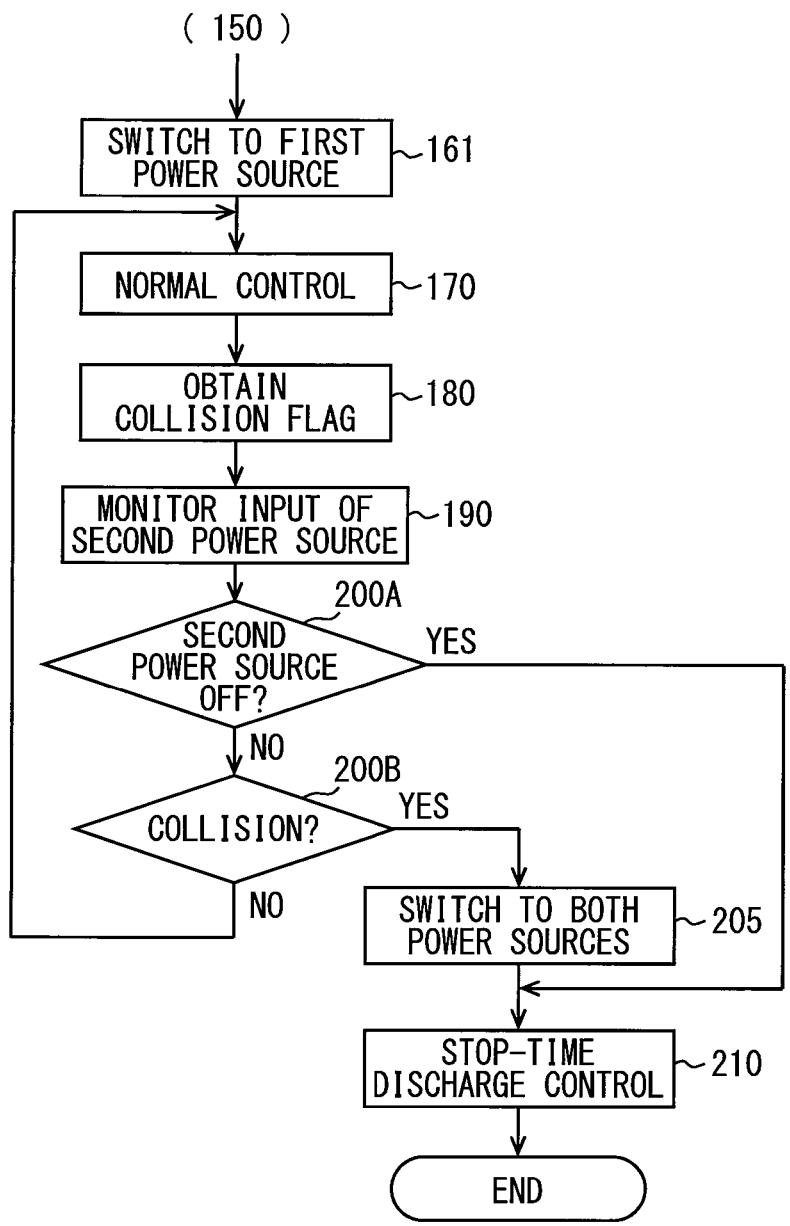
FIG. 6 is a flowchart depicting an outline of a control operation by a control portion of a third embodiment.

As is shown in FIG. 6, in this embodiment, after a control portion 101 performed Step 190, the control portion 101 determines whether a voltage application state detected in Step 190 is an OFF state (Step 200A). When the control portion 101 determines in Step 200A that the voltage application state from a DC power supply 21 is an ON state, the control portion 101 subsequently determines whether a collision flag obtained in Step 180 is ON (Step 200B).

When the control portion 101 determines in Step 200B that the collision flag is OFF, the control portion 101 returns to Step 170 and continues a normal operation control. When the control portion 101 determines in Step 200A that the voltage application state from the DC power supply 21 is an OFF state, the control portion 101 proceeds to Step 210. When the control portion 101 determines in Step 200B that the collision flag is ON, the control portion 101 obtains power from the DC power supply 21 (Step 205).

In Step 205, power from buses 30 after voltage conversion in a transformer 106 and power from the DC power supply 21 after voltage conversion in a transformer 107 are obtained from a power-supply circuit 105. The control portion 101 proceeds to Step 210 after power from a high-voltage system and power from a low-voltage system are obtained in Step 205.

In a case where the control portion 101 proceeds to Step 210 by determining in Step 200A that the voltage application state from the DC power supply 21 is an OFF state, an operating voltage generation portion obtains power from the high-voltage system alone. Hence, the control portion 101 performs the stop-discharge control in Step 210 using power supplied from the buses 30. When power is supplied to the buses 30 from a DC power supply 20, the control portion 101 performs Step 210 using power supplied from the DC power supply 20 and discharge power of a capacitor 70. When a feed path from the DC power supply 20 is cut off because the buses 30 break or a high-voltage relay system 50 is opened, the control portion 101 performs Step 210 using discharge power of the capacitor 70.

On the other hand, in a case where the control portion 101 proceeds to Step 210 from Step 205, the operating voltage generation portion obtains power from both of the high-voltage system and the low-voltage system. Hence, the control portion 101 performs Step 210 using power supplied from the DC power supply 21 and power supplied from the buses 30.

According to this embodiment, effects same as the effects of the second embodiment above can be obtained. In addition, when the control portion 101 performs the stop-discharge control, power is obtained also from the low-voltage system when power can be fed from the low-voltage system. During the stop-discharge control, the capacitor 70 is also discharged in the high-voltage system. Hence, power can be obtained in a stable manner due to feeding from the low-voltage system.

Fourth Embodiment

A fourth embodiment will now be described according to FIG. 7.

The fourth embodiment is different from the first through third embodiments above in that operation power is fed preferentially from a low-voltage system after a boot sequence. Portions same as the portions of the first through third embodiments above are labeled with same reference numerals and a description is omitted herein. Configurations labeled with reference numerals same as the reference numerals used in the drawings referred to in the first through third embodiments above and other configurations which are not described in the fourth embodiment are the same as the configurations of the first through third embodiments above and exert the same function and effect.

Figure 7:
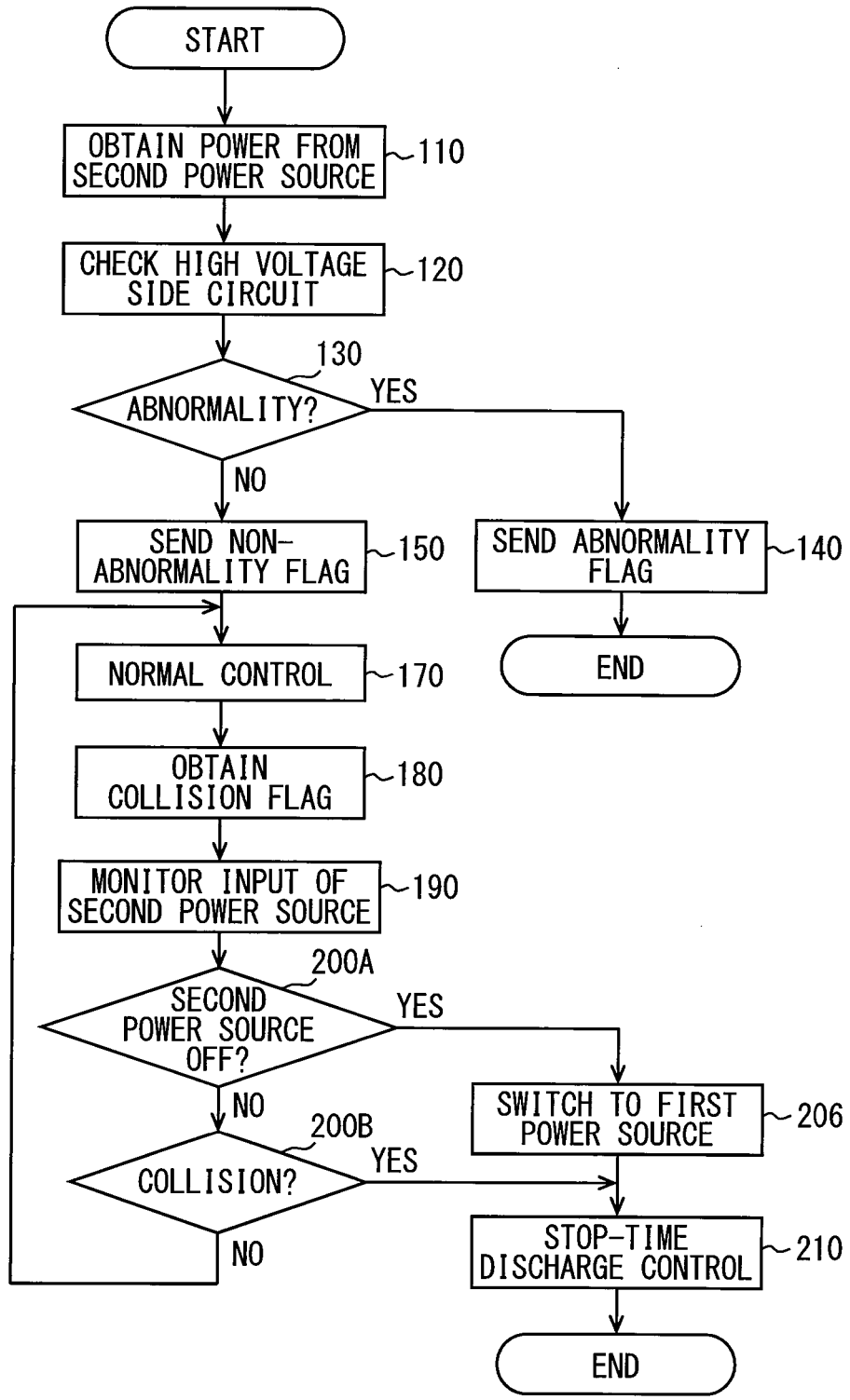
FIG. 7 is a flowchart depicting an outline of a control operation by a control portion of a fourth embodiment.

As is shown in FIG. 7, in this embodiment, after a control portion 101 performed Step 150, the control portion 101 performs Step 170 and subsequent steps while continuously obtaining power from a DC power supply 21.

When the control portion 101 determines in Step 200A that a voltage application state from the DC power supply 21 is an OFF state, the control portion 101 obtains power from buses 30 (Step 206). That is to say, in Step 206, power being obtained is switched from power from the DC power supply 21 after voltage conversion in a transformer 107 to power from the buses 30 after voltage conversion in a transformer 106. The control portion 101 subsequently proceeds to Step 210.

The control portion 101 proceeds to Step 210 when the control portion 101 determines in Step 200B that a collision flag is ON.

In a case where the control portion 101 proceeds to Step 210 from Step 206, an operating voltage generation portion obtains power from a high-voltage system alone. Hence, the control portion 101 performs a stop-discharge control in Step 210 using power supplied from the buses 30. When power is supplied to the buses 30 from a DC power supply 20, the control portion 101 performs Step 210 using power supplied from the DC power supply 20 and discharge power of a capacitor 70. When a feed path from the DC power supply 20 is cut off because the buses 30 break or a high-voltage relay system 50 is opened, the control portion 101 performs Step 210 using discharge power of the capacitor 70.

On the other hand, when the control portion 101 determines in Step 200B that a collision flag is ON, the operating voltage generation portion obtains power from the low-voltage system alone. Hence, the control portion 101 performs Step 210 using power supplied from the DC power supply 21.

According to this embodiment, at least during a normal operation, the control portion 101 controls the operating voltage generation portion to supply as much power as a total of power consumed by a drive circuit portion 102 and the control portion 101 from the DC power supply 21. Even when power can be fed to the operating voltage generation portion from both of the high-voltage system and the low-voltage system, power is fed preferentially from the low-voltage system.

The operating voltage generation portion is thus capable of supplying power supplied from the DC power supply 21 as power consumed by the drive circuit portion 102 and the control portion 101. Power is therefore fed from the high-voltage system only during the stop-discharge control when power cannot be fed from the low-voltage system. Hence, by adopting a transformer having relatively less satisfactory efficiency as the transformer 106, the capacitor 70 can be discharged further quickly.

Alternatively, it may be configured in such a manner that when the control portion 101 performs Step 170 and subsequent steps by adopting, for example, the transformer 106 having relatively satisfactory efficiency, power is supplied slightly from the high-voltage system in addition to power supplied from the low-voltage system. That is to say, when the control portion 101 performs Step 170 and subsequent steps, power supplied from the DC power supply 21 after voltage conversion in the transformer 107 is obtained as main power and power supplied from the buses 30 after voltage conversion in the transformer 106 is obtained as subsidiary power from a power-supply circuit 105. When configured as above, a feed path from the high-voltage system is in operation before the control portion 101 performs Step 206. Hence, an action can be taken quickly when the control portion 101 performs Step 206.

Fifth Embodiment

A fifth embodiment will now be described according to FIG. 8.

The fifth embodiment is different from the fourth embodiment above in that a stop-discharge control is performed using power fed from a high-voltage system regardless of whether power can be fed from a low-voltage system. Portions same as the portions of the first through fourth embodiments above are labeled with same reference numerals and a description is omitted herein. Configurations labeled with reference numerals same as the reference numerals used in the drawings referred to in the first through fourth embodiments above and other configurations which are not described in the fifth embodiment are the same as the configurations of the first through fourth embodiments above and exert the same function and effect.

Figure 8:
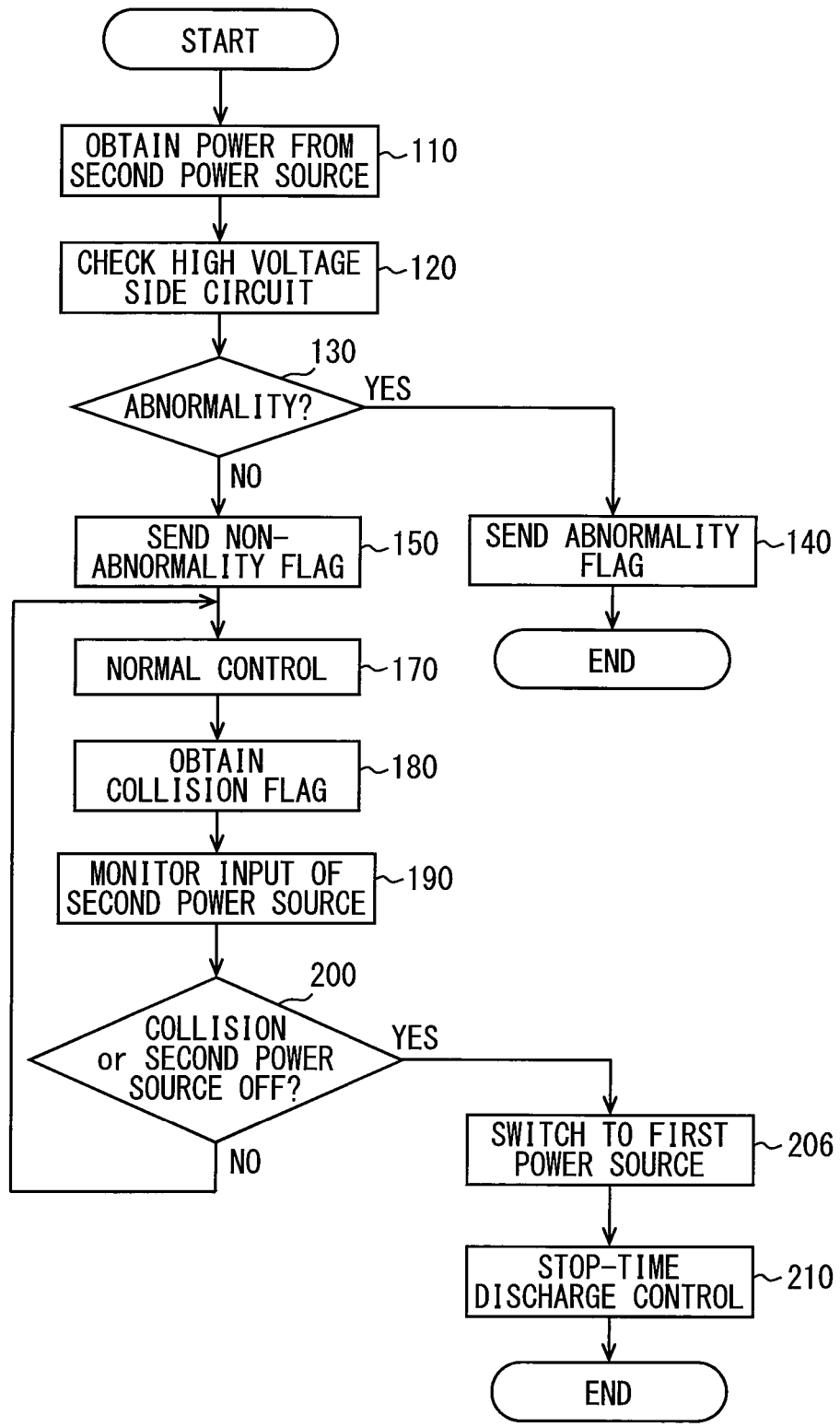
FIG. 8 is a flowchart depicting an outline of a control operation by a control portion of a fifth embodiment.

As is shown in FIG. 8, in this embodiment, when a control portion 101 determines in Step 200 that a collision flag is ON or that a voltage application state from a DC power supply 21 is an OFF state, the control portion 101 performs Step 206 in either case and subsequently performs Step 210.

In other words, as has been described in the fourth embodiment above, when the control portion 101 determines in Step 200A that the voltage application state from the DC power supply 21 is an OFF state or the control portion 101 determines in Step 200B that the collision flag is ON, the control portion 101 proceeds to Step 206 in either case. The control portion 101 subsequently proceeds to Step 210 and performs the stop-discharge control.

Hence, when the control portion 101 performs Step 210, an operating voltage generation portion obtains power from the high-voltage system alone. The control portion 101 therefore performs the stop-discharge control in Step 210 using power supplied from buses 30. When power is supplied to the buses 30 from a DC power supply 20, the control portion 101 performs Step 210 using power supplied from the DC power supply 20 and discharge power of a capacitor 70. When a feed path from the DC power supply 20 is cut off because the buses 30 break or a high-voltage relay system 50 is opened, the control portion 101 performs Step 210 using discharge power of the capacitor 70.

According to this embodiment, at least during a normal operation, the control portion 101 controls the operating voltage generation portion to supply as much power as a total of power consumed by a drive circuit portion 102 and the control portion 101 from the DC power supply 21. Even when power can be fed to the operating voltage generation portion from both of the high-voltage system and the low-voltage system, power is fed preferentially from the low-voltage system.

During the stop-discharge control, power is obtained from the high-voltage system regardless of whether the low-voltage system is in an ON or OFF state. When configured as above, the capacitor 70 can be discharged extremely quickly regardless of whether the buses 30 or a harness 31 breaks by adopting a transformer having relatively less satisfactory efficiency as a transformer 106.

In this embodiment, too, when the control portion 101 performs Step 170 and subsequent steps by adopting the transformer 106 having relatively satisfactory efficiency, power may be supplied slightly from the high-voltage system in addition to power supplied from the low-voltage system. That is to say, when the control portion 101 performs Step 170 and subsequent steps, power supplied from the DC power supply 21 after voltage conversion in a transformer 107 is obtained as main power and power supplied from the buses 30 after voltage conversion in the transformer 106 is obtained as subsidiary power from a power-supply circuit 105. When configured as above, a feed path from the high-voltage system is in operation before the control portion 101 performs Step 206. Hence, an action can be taken quickly when the control portion 101 performs Step 206.

Sixth Embodiment

A sixth embodiment will now be described using FIG. 9.

The sixth embodiment is different from the fifth embodiment above in that operation power is fed from both of a high-voltage system and a low-voltage system after a boot sequence. Portions same as the portions of the first through fifth embodiments above are labeled with same reference numerals and a description is omitted herein. Configurations labeled with reference numerals same as the reference numerals used in the drawings referred to in the first through fifth embodiments above and other configurations which are not described in the sixth embodiment are the same as the configurations of the first through fifth embodiments above and exert the same function and effect.

Figure 9:
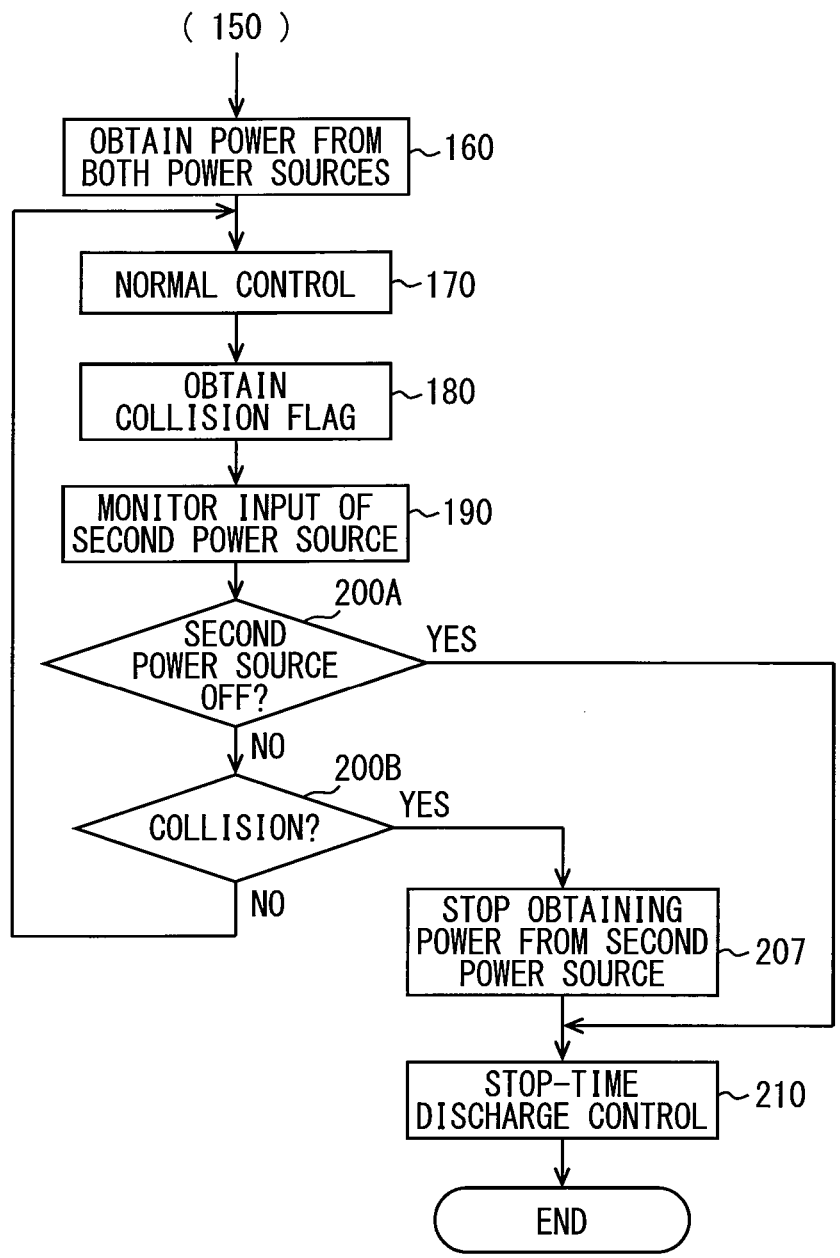
FIG. 9 is a flowchart depicting an outline of a control operation by a control portion of a sixth embodiment.

As is shown in FIG. 9, in this embodiment, after a control portion 101 performed Step 150, the control portion 101 obtains power from a DC power supply 20. In Step 160, power from the DC power supply 20 after voltage conversion in a transformer 106 and power from buses 30 after voltage conversion in a transformer 107 are obtained from a power-supply circuit 105. Subsequently, the control portion 101 performs Step 170 and subsequent steps.

When the control portion 101 determines in Step 200A that a voltage application state from a DC power supply 21 is an OFF state, the control portion 101 proceeds to Step 210. When the control portion 101 determines in Step 200B that a collision flag is ON, the control portion 101 stops obtaining power from the DC power supply 21 (Step 207).

In Step 207, feeding of power from the DC power supply 21 after voltage conversion in the transformer 107 is stopped. Accordingly, power only from the DC power supply 20 after voltage conversion in the transformer 106 is obtained from the power-supply circuit 105. Consequently, power obtained from the high-voltage system is increased. The control portion 101 proceeds to Step 210 after power from the high-voltage system is obtained in Step 207.

In a case where the control portion 101 proceeds to Step 210 by determining in Step 200A that the voltage application state from the DC power supply 21 is an OFF state, an operating voltage generation portion obtains power from the high-voltage system alone. In a case where the control portion 101 proceeds to Step 210 from Step 207, too, the operating voltage generation portion obtains power from the high-voltage system alone. Hence, in either case, the control portion 101 performs a stop-discharge control in Step 210 using power supplied from the buses 30.

When power is supplied to the buses 30 from the DC power supply 20, the control portion 101 performs Step 210 using power supplied from the DC power supply 20 and discharge power of a capacitor 70. When a feed path from the DC power supply 20 is cut off because the buses 30 break or a high-voltage relay system 50 is opened, the control portion 101 performs Step 210 using discharge power of the capacitor 70.

According to this embodiment, during a normal operation, the control portion 101 controls the operating voltage generation portion to supply as much power as a total of power consumed by a drive circuit portion 102 and the control portion 101 from both of the DC power supply 20 and the DC power supply 21. During the stop-discharge control, power can be obtained from the high-voltage system regardless of whether the low-voltage system is in an ON or OFF state.

Seventh Embodiment

A seventh embodiment will now be described according to FIG. 10.

The seventh embodiment is different from the first embodiment above in that discharge of high-voltage charges is stopped when a voltage of a high-voltage system does not decrease even after a predetermined condition set in advance is satisfied. Portions same as the portions of the first through sixth embodiments above are labeled with same reference numerals and a description is omitted herein. Configurations labeled with reference numerals same as the reference numerals used in the drawings referred to in the first through sixth embodiments above and other configurations which are not described in the seventh embodiment are the same as the configurations of the first through sixth embodiments above and exert the same function and effect.

Figure 10:
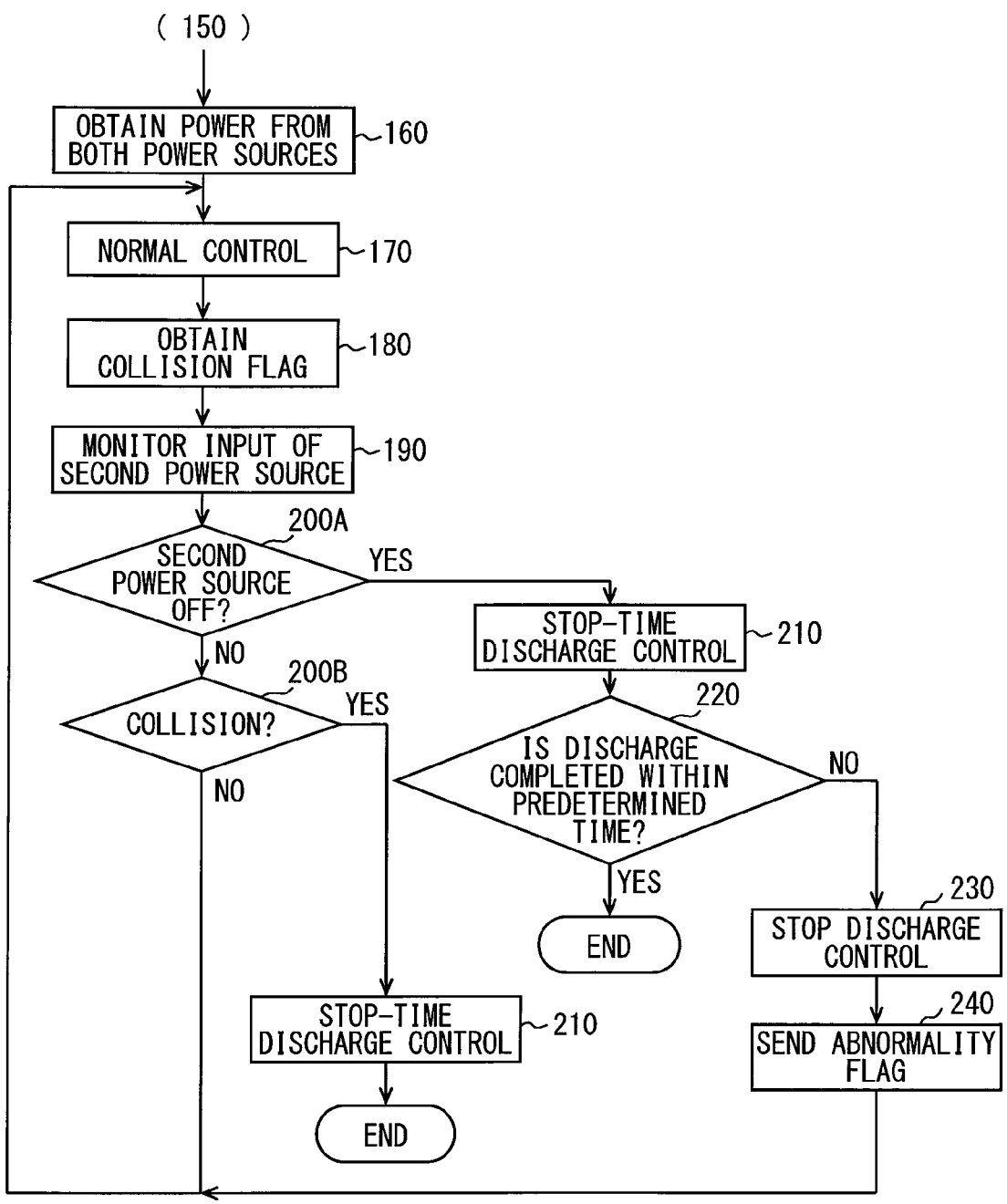
FIG. 10 is a flowchart depicting an outline of a control operation by a control portion of a seventh embodiment.

As is shown in FIG. 10, in this embodiment, after a control portion 101 performed Step 190, the control portion 101 determines whether a voltage application state detected in Step 190 is an OFF state (Step 200A). When the control portion 101 determines in Step 200A that the voltage application state from a DC power supply 21 is an ON state, the control portion 101 determines whether a collision flag obtained in Step 180 is ON (Step 200B).

When the control portion 101 determines in Step 200B that the collision flag is OFF, the control portion 101 returns to Step 170 and repeats Step 170 and subsequent steps including a normal operation control. When the control portion 101 determines in Step 200B that the collision flag is ON, the control portion 101 proceeds to Step 210 and performs a stop-discharge control and ends the control.

When the control portion 101 determines in Step 200A that the voltage application state from the DC power supply 21 is an OFF state, the control portion 101 proceeds to Step 210. While the control portion 101 continues to perform Step 210, the control portion 101 determines whether discharge of a capacitor 70 is completed within a predetermined time (Step 220). In Step 220, the control portion 101 determines, for example, whether a voltage between buses 30 decreased below a predetermined voltage before a predetermined time elapsed.

When the control portion 101 determines in Step 220 that the discharge is completed within the predetermined time, the control portion 101 ends the control. When the control portion 101 determines in Step 220 that the discharge is not completed within the predetermined time, the control portion 101 stops the stop-discharge control (Step 230), and sends an abnormality flag informing an abnormal state to a high-level control device 300 (Step 240), after which the control portion 101 returns to Step 170.

In a case where the control portion 101 proceeds to Step 210 by determining in Step 200A that the voltage application state from the DC power supply 21 is an OFF state, an operating voltage generation portion obtains power from the high-voltage system alone. Hence, the control portion 101 performs the stop-discharge control in Step 210 using power supplied from the buses 30. When power is supplied to the buses 30 from a DC power supply 20, the control portion 101 performs Step 210 using power supplied from the DC power supply 20 and discharge power of the capacitor 70.

When a feed path from the DC power supply 20 is cut off because the buses 30 break or a high-voltage relay system 50 is opened, the control portion 101 performs Step 210 using discharge power of the capacitor 70.

On the other hand, in a case where the control portion 101 proceeds to Step 210 by determining in Step 200B that the collision flag is ON, the operating voltage generation portion obtains power from both of the high-voltage system and a low-voltage system. Hence, the control portion 101 performs Step 210 using power supplied from the DC power supply 21 and power supplied from the buses 30.

According to this embodiment, effects same as the effects of the first embodiment above can be obtained. Also, the control portion 101 stops a discharge control operation when discharge of charges from the capacitor 70 is not completed after the discharge control operation is continued for a predetermined time. Consequently, power can be prevented from being consumed continuously due to the discharge control operation which is continued even in the absence of an inconvenience, such as a collision of a vehicle.

For example, in a case where a supply of power from the DC power supply 21 stops when a connection portion of a harness 31 is disconnected after the vehicle is started, discharge may not be completed within the predetermined time. In such a case, a signal informing an abnormal state is outputted to the high-level control device 300 while a normal operation of an electric compressor 10 is continued.

Eighth Embodiment

Figure 12:
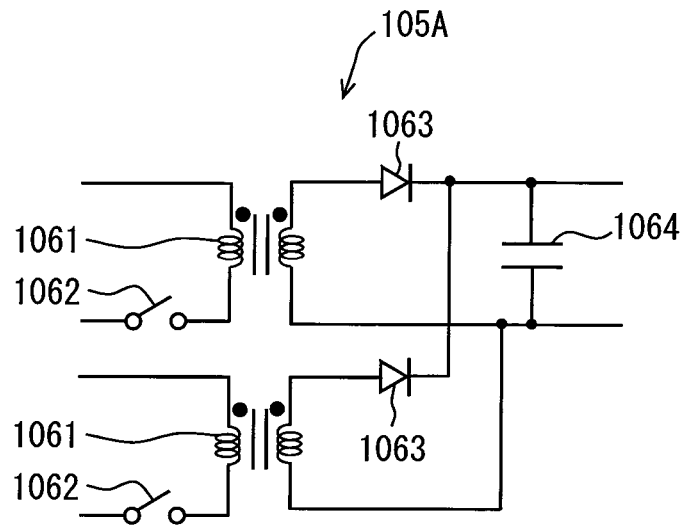
FIG. 12 is a view showing a schematic configuration of an insulating transformer.
Figure 13:
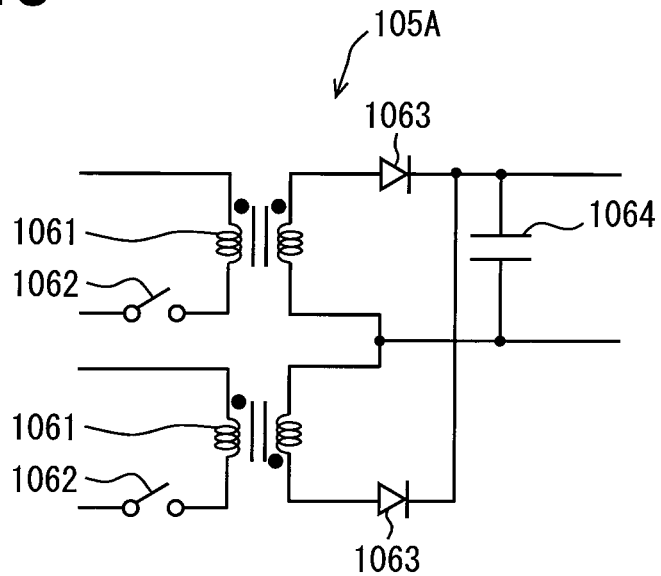
FIG. 13 is a view showing another schematic configuration of an insulating transformer.

An eighth embodiment will be described according to FIG. 11 through FIG. 13.

The eighth embodiment is different from the first through seventh embodiments in a configuration of an operating voltage generation portion. Portions same as the portions of the first embodiment above are labeled with same reference numerals and a description is omitted herein. Configurations labeled with reference numerals same as the reference numerals used in the drawings referred to in the first embodiment above and other configurations which are not described in the eighth embodiment are the same as the configurations of the first embodiment above and exert the same function and effect.

Figure 11:
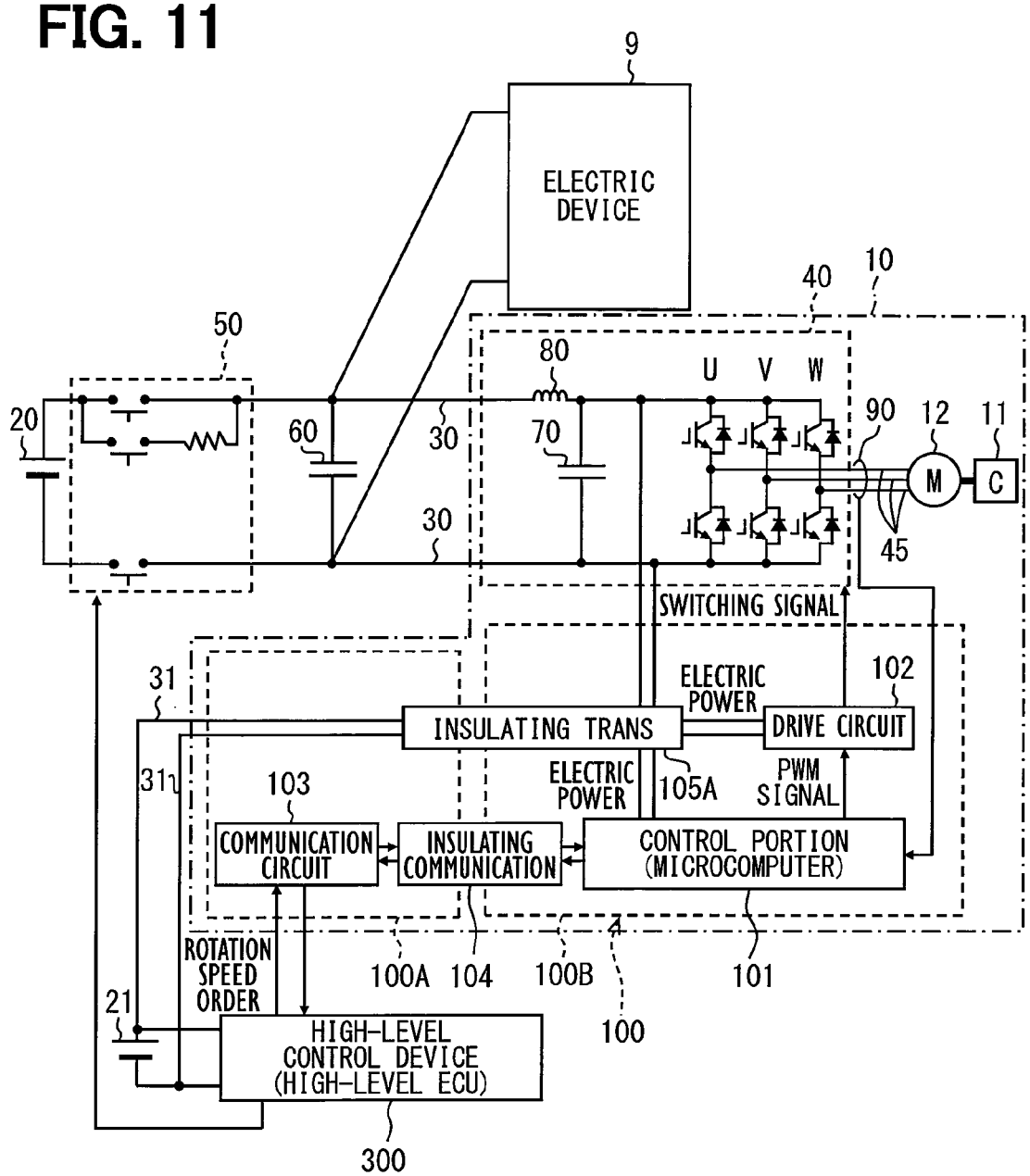
FIG. 11 is a circuit diagram, partly a block diagram, of a motor drive device of an eighth embodiment.

As is shown in FIG. 11, in this embodiment, the operating voltage generation portion is a single insulating transformer 105A. That is to say, in this embodiment, the operating voltage generation portion is the insulating transformer 105A intensively furnished with functions of the power-supply circuit 105, the transformer 106, and the transformer 107, which together form the operating voltage generation portion in the first embodiment above. The insulating transformer 105A can be a voltage conversion device configured as is shown, for example, in FIG. 12 or FIG. 13.

According to the configuration of this embodiment, effects same as the effects of the first embodiment above can be obtained.

Other Embodiments

While the above has described preferred embodiments of the present disclosure, the present disclosure is not limited to the embodiments above and can be implemented in various modifications within the scope of the present disclosure.

In the embodiments above, the synchronous motor 12 is a synchronous motor having a three-phase coil. However, the synchronous motor 12 is not limited to the above example, and can be any motor having a multi-phase motor coil.

In the embodiments above, both of the DC power supplies 20 and 21 as a feed source and the electric compressor 10 including the motor drive device are installed to the vehicle. However, the present disclosure is not limited to the configuration as above. For example, the feed source may be installed to the vehicle and the electric compressor including the motor drive device may be of a stationary type. Further, the feed source is not necessarily installed to the vehicle, and may be installed to a mobile object, such as an air plane and a marine vessel. The electric compressor including the motor drive device may also be installed to a mobile object. In addition, the feed source is not necessarily installed to a mobile object and may be of a stationary type.

In the embodiments above, the motor drive device drives a motor and a load driven by the motor is the compression mechanism of the compressor provided in the heat pump cycle of the vehicle air conditioning device. However, the motor drive device is not limited to the above example, and the load driven by the motor may be, for example, a stationary compression mechanism or a load other than the compression mechanism.

The invention claimed is:

1. A motor drive device comprising:
an inverter circuit having switching elements provided correspondingly to a plurality of phases of a motor having a multi-phase motor coil, and a smoothing capacitor provided in parallel with the switching elements;
a drive circuit portion that drives the switching elements by outputting an operation signal to the inverter circuit;
a control portion that controls the drive circuit portion by pulse width modulation (PWM) to make the switching elements to conduct switching operation; and
an operating voltage generation portion that supplies power to the drive circuit portion and the control portion by generating an operating voltage for the drive circuit portion and the control portion, wherein:
the inverter circuit converts a DC voltage from a first power supply to an AC voltage by PWM control by switching the switching elements and outputs the AC voltage to the multi-phase motor coil;
the control portion outputs a PWM signal to the drive circuit portion according to a drive state command value of the motor output from a high-level control device that operates on power from a second power supply outputting a voltage lower than the first power supply;
the operating voltage generation portion is capable of generating the operating voltage using power fed from either of the first power supply and the second power supply; and
the operating voltage generation portion supplies as much power as a total of power consumed by the drive circuit portion and the control portion from at least either the first power supply or the second power supply.

2. The motor drive device according to claim 1, wherein:
the operating voltage generation portion supplies power consumed by the drive circuit portion from the first power supply and supplies power consumed by the control portion from the second power supply.

3. The motor drive device according to claim 1, wherein:
the control portion controls the operating voltage generation portion to supply as much power as a total of power consumed by the drive circuit portion and the control portion from the first power supply.

4. A motor drive device comprising:
an inverter circuit having switching elements provided correspondingly to a plurality of phases of a motor having a multi-phase motor coil, and a smoothing capacitor provided in parallel with the switching elements;
a drive circuit portion that drives the switching elements by outputting an operation signal to the inverter circuit;
a control portion that controls the drive circuit portion by pulse width modulation (PWM) to make the switching elements to conduct switching operation; and
an operating voltage generation portion that supplies power to the drive circuit portion and the control portion by generating an operating voltage for the drive circuit portion and the control portion, wherein:
the inverter circuit converts a DC voltage from a first power supply to an AC voltage by PWM control by switching the switching elements and outputs the AC voltage to the multi-phase motor coil;
the control portion outputs a PWM signal to the drive circuit portion according to a drive state command value of the motor output from a high-level control device that operates on power from a second power supply outputting a voltage lower than the first power supply;
the operating voltage generation portion is capable of generating the operating voltage using power fed from either of the first power supply and the second power supply; and
when the motor is stopped, the control portion performs a discharge control operation to discharge charges from the smoothing capacitor.

5. The motor drive device according to claim 4, wherein:
the control portion controls the operating voltage generation portion to perform the discharge control operation using power supplied from a bus which feeds power from the first power supply to the inverter circuit.

6. The motor drive device according to claim 5, wherein:
when the control portion performs the discharge control operation, the control portion increases power consumed by at least one of the inverter circuit, the drive circuit portion, the control portion, and the operating voltage generation portion compared with power consumed before the discharge control operation begins.

7. The motor drive device according to claim 4, wherein:
the control portion stops the discharge control operation when discharge of charges from the smoothing capacitor is not completed even after the discharge control operation is continued for a predetermined time.

8. A motor drive device comprising:
an inverter circuit having switching elements provided correspondingly to a plurality of phases of a motor having a multi-phase motor coil, and a smoothing capacitor provided in parallel with the switching elements;
a drive circuit portion that drives the switching elements by outputting an operation signal to the inverter circuit;
a control portion that controls the drive circuit portion by pulse width modulation (PWM) to make the switching elements to conduct switching operation; and
an operating voltage generation portion that supplies power to the drive circuit portion and the control portion by generating an operating voltage for the drive circuit portion and the control portion, wherein:
the inverter circuit converts a DC voltage from a first power supply to an AC voltage by PWM control by switching the switching elements and outputs the AC voltage to the multi-phase motor coil;
the control portion outputs a PWM signal to the drive circuit portion according to a drive state command value of the motor output from a high-level control device that operates on power from a second power supply outputting a voltage lower than the first power supply;
the operating voltage generation portion is capable of generating the operating voltage using power fed from either of the first power supply and the second power supply; and
a load driven by the motor is a compression mechanism which draws in and compresses a refrigerant in a refrigeration cycle installed to a vehicle.

\* \* \* \* \*